Figure 1:
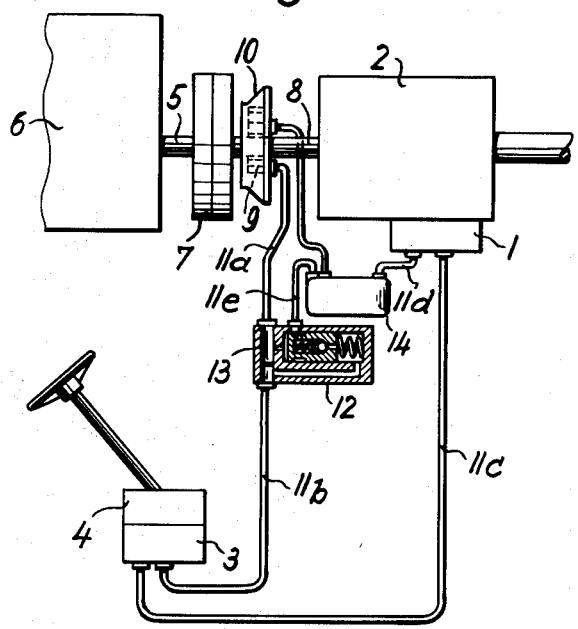

Aug. 3, 1965  HANS-JOACHIM M. FÖRSTER  3,197,960
HYDRAULIC SYSTEM FOR POWER STEERING AND GEAR
SHIFTING OF MOTOR VEHICLES
Filed Dec. 28, 1962

INVENTOR
Hans-Joachim M. Förster

BY  Dicke & Craig

ATTORNEYS

United States Patent Office 3,197,960
Patented Aug. 3, 1965

3,197,960
HYDRAULIC SYSTEM FOR POWER STEERING AND GEAR SHIFTING OF MOTOR VEHICLES
Hans-Joachim M. Förster, Stuttgart-Riedenberg, Germany, assignor to Daimler-Benz Aktiengesellschaft, Stuttgart-Untertürkheim, Germany
Filed Dec. 28, 1962, Ser. No. 248,153
Claims priority, application Germany, Jan. 3, 1962, D 37,835
6 Claims. (Cl. 60—52)

The present invention relates to a hydraulic system for power steering and also for hydraulically operating the gear-shifting means of a motor vehicle, wherein for facilitating the steering operation and operating the gear-shifting means of the vehicle a pressure is developed from an oil circuit in such a manner that, when one of the distributing slide valves, which are associated with the steering and gear shifting means, respectively, and the position of which at any time depends upon the particular position of the steering wheel or the gear-shifting means, is shifted out of its central position, it produces a throttling of the oil circuit whereby a pressure is developed which is used for the operation of the power steering or gear shifting means. The present invention is of particular importance for motor vehicles which are equipped with automatic gear shifting means.

There is at present an increasing trend to equip heavy trucks and high-powered cars of the more expensive kinds with hydraulic power steering means and also with hydraulic means for facilitating or automatically controlling the gear-shifting operations. Each hydraulic circuit for the steering and gear-shifting means is then associated with an oil circuit which is supplied with oil by a separate pump.

In the hydraulic systems for motor vehicles which were known prior to this invention, the individual hydraulic control units produced the required oil pressure in a similar manner as above described by reducing the pressure coming from a high-pressure tank which was supplied by a high pressure pump. These hydraulic systems had, however, the disadvantage that the control units which were connected to the high-pressure tank could not act until after the elapse of a certain and often considerable length of time. Such a pressure supply from a common high-pressure tank is, however, totally unsuitable for the operation of power steering and gear-shifting means which must occur rapidly. Furthermore, the constant high pressure which has to be maintained in the pressure tank and in the associated pressure lines and elements requires very expensive sealing means. Hydraulic power steering and gear shifting means are therefore presently usually provided with separate hydraulic systems in which the oil in each circuit is supplied by a separate pump. The development of the pressure required for operating the power steering and gear shifting means is then produced by throttling the respective oil circuit by means of the associated distributing slide valve. For this purpose, the slide valve, the position of which is dependent at any time upon the position of the steering wheel for the gear shifting means is designed so as to cause the oil circuit to be throttled whenever it is shifted from its central position even for the shortest distance. The most serious disadvantage of this system is the very high expense of providing two complete oil circuits which are entirely independent of each other.

It is an object of the present invention to provide suitable means which permit the hydraulic system which is required for the operation of the power steering and gear-shifting means to be considerably simplified and its cost of production to be greatly reduced.

This object is attained according to the invention essentially by connecting the slide valves for the steering and gear-shifting means in series into a single oil circuit which is supplied by a high-pressure pump.

When employing such a series connection, it has surprisingly been found that in order to comply with the requirements occurring in the actual operation of a motor vehicle, the single high-pressure pump which is then required has to be only slightly larger than each of the pumps which were previously required. This is primarily due to the fact that the maximum delivery of the pump for developing the necessary pressure in front of the respective slide valve and for actuating the control piston is required for the operation of the gear-shifting means, for example, of an automatic gear-shifting mechanism, only when the gears actually have to be shifted and for the operation of the power steering means only when the steering wheel has to be turned to a very great extent which hardly ever occurs except in parking, or when driving out of a parking space, or at similar occurrences. Therefore, there is practically no need to consider that the pump might have to meet at the same time the maximum requirements of both systems, that is, for the gear shifting and power steering operations. It is further evident that the invention overcomes the disadvantages resulting from the application of a constant high pressure including the difficulties of attaining effective sealing means, as well as the expense of producing and maintaining two separate hydraulic circuits.

According to a preferred embodiment of the invention, a by-pass valve is connected into the oil circuit between the pressure side of the high-pressure pump and the first slide valve in the course of the circuit for limiting the delivery output of the high-pressure pump. According to a further embodiment of the invention a high-pressure relief valve may also be connected into the oil circuit for reducing the maximum pressure in the oil circuit to the sum of the maximum pressures which are required for the steering and gear-shifting operations.

A further embodiment of the invention may consist in combining the high-pressure relief valve with the by-pass valve and in mounting both valves within the housing of the high-pressure pump. A preferred feature of the invention further consists in connecting the slide valve for the power steering means into the oil circuit so as to be disposed in front of the slide valve for the gear shifting means.

The above-mentioned as well as additional features and advantages of the present invention will become more clearly apparent from the following detailed description thereof which is to be read with reference to the accompanying drawings, in which—

Figure 2:
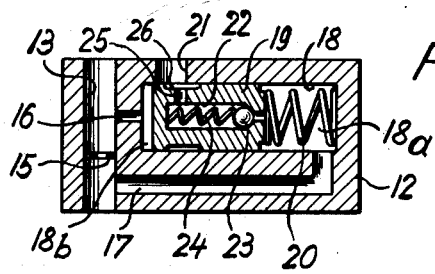

FIGURE 1 shows a diagrammatic illustration of the common oil circuit according to the invention for the oil supply for the operation of the power steering mechanism and gear shifting mechanism of a motor vehicle; while FIGURE 2 shows an enlarged sectional view of the by-pass valve of the oil circuit as shown in FIGURE 1.

Referring to the drawings, a motor vehicle of which only those parts are shown which are essential to the invention and which is driven by an internal combustion engine in the conventional manner with a change-speed gear 2 which is provided with gear shifting means, for example, of an automatic type, which are contained in a control box 1 and are hydraulically operated. It is further equipped with a steering gear 4 which is provided with a hydraulic power steering unit 3. The change-speed gear 2 is adapted to be coupled to the driven shaft 5 of the engine 6 by means of a friction or fluid flywheel clutch 7. The drive shaft 8 of gear unit 2 carries the impeller 9 of a high-pressure pump 10, for example, of a vane type, which supplies the oil for the oil circuit 11a, 11b, 11c, 11d, and 11e. Pump 10 is driven by the engine 6, for example, by the primary housing of a fluid flywheel clutch. If there is no such housing or if the clutch is of a different type, pump 10 may be mounted directly on the driven shaft 5 of the engine.

The high-pressure line 11a of the oil circuit leads from the pressure side of pump 10 first to a by-pass valve 12 as illustrated in detail in FIGURE 2, which limits the maximum output of the high-pressure pump. This by-pass valve 12 is provided with a continuous transverse channel 13 for connecting the high-pressure line 11a with the high-pressure line 11b which leads to the distributing slide valve or throttle control means, not shown, of the power steering unit 3. From this slide valve of the power steering unit 3 which causes a considerable drop in pressure the low-pressure line 11c for the return oil leads downstream to the slide valve or throttle control means, not shown, for the operation of the gear shifting means in the control box 1. The oil return line 11d then leads from the control box 1 to the oil tank 14 which is connected to the suction side of the high-pressure pump 10. Furthermore, a branch line 11e which branches off the by-pass valve 12 as will be subsequently described also terminates in the oil tank 14.

As shown in FIGURE 2, the transverse channel 13 in the by-pass valve 12 is provided with an apertured diaphragm 15, and channel 13 is connected at both sides of diaphragm 15 through connecting channels 16 and 17 to the opposite ends of a cylinder 18 in which a by-pass valve piston 19 is slidable, the right end of which is acted upon by a compression spring 20 and which is held under an initial pressure in its left end position. When piston 19 is located in this position, channel 21 which is connected to the branch line 11e and terminates in cylinder 18 will be closed by the piston relative to the cylinder chamber.

The by-pass valve piston 19 is designed so as also to serve as a high-pressure relief valve and is for this purpose provided with an axially extending socket bore 22 which has an opening toward the part 18a of cylinder 18 which, in turn, communicates with the connecting channel 17, although this opening is usually closed by a ball 23 which is acted upon by a coil spring 24 and forms the valve member of the high-pressure relief valve.

The socket bore 22 further communicates constantly through a radial bore 25 and a peripheral recess 26 in the outer wall surface of piston 19 with the connecting channel 21 and through the latter with the branch line 11e of the oil circuit as described.

Due to the provision of apertured diaphragm 15 in the transverse channel 13 and due to the fact which is evident from FIGURE 2 that both sides of piston 19 are acted upon by the oil which is branched off in front of and behind diaphragm 15, piston 19 is moved against the force of the compression spring 20 toward the right to an extent which is in proportion to the difference in pressure in front of and behind diaphragm 15, that is, to an extent which increases in accordance with the increasing rate of flow of the oil through diaphragm 15, until finally—when the rate of flow increases beyond a predetermined value—the part 18b of cylinder 18 at the left side of piston 19 communicates with the connecting channel 21. The amount of oil which is conveyed into the outer oil circuit when the high-pressure pump 10 exceeds a relatively low minimum speed is in this manner limited to a substantially constant value which is in accordance with the desired oil supply and may in an actual case of such an oil circuit amount, for example, to about 10 to 15 liters per minute. Excessive pressure peaks which could ordinarily occur if the oil circuit is too strongly throttled by the slide valve for the power steering unit or the slide valve for the gear shifting unit or by both valves, are completely avoided since in such cases the oil can flow back to the oil tank 14 through the pressure relief valve in piston 19.

The power steering unit 3 and the control box 1 of the gear shifting means are supplied with oil by the high-pressure pump 10 through the oil circuit as described in the following manner:

As soon as engine 6 has been started, pump 9 is also driven. As long as the slide valves for the power steering unit and the gear shifting means, the particular position of which depends at any time upon the position of the steering wheel and the position of the gear shifting means, are in their respective central positions, the oil which is supplied by the high-pressure pump through the oil circuit 11a, 11b, 11c, and 11d passes these slide valves without pressure since the valves are of an open center type. If at a turn of the steering wheel or at an actuation of the gear shifting means one of the slide valves, the position of which depends at any time upon the particular position of the steering wheel or the position of the gear shifting means, is moved out of its central position, this slide valve not only forms a connection between the power steering unit or the gear shifting means with the oil circuit, but by the throttling effect of the slide valves a pressure is developed in the entire oil circuit as is required for the respective internal circuit of the steering or gear-shifting means.

Since for the operation of the gear shifting means a lower pressure is required than for the power steering means, the slide valve for the gear shifting means is connected into the oil circuit at a point behind the slide valve for the power steering means. The pressure which may still be developed in the low-pressure line 11c when the power steering means are operating under a full load will always be of a sufficient strength for operating the gear shifting means. This may be insured, for example, by making spring 24 of the pressure relief valve of such a strength that this valve will not open until the sum of the predetermined maximum pressures of both systems is being exceeded.

Although my invention has been illustrated and described with reference to the preferred embodiment thereof, I wish to have it understood that it is in no way limited to the details of such embodiment, but is capable of numerous modifications within the scope of the appended claims. In particular, the invention may also be applied to gears of other types of construction, provided that they can be shifted by hydraulic control means which in principle are similar to those as are herein described.

Having thus fully disclosed my invention, what I claim is:

1. A hydraulic system for a motor vehicle having an engine, change-speed gear means, shifting means for said change-speed gear means, and power steering means, said motor vehicle being provided with means for controlling the travel of the vehicle including throttle control means for said power steering means and further throttle control means for operating said shifting means for said change-speed gear means, said system comprising fluid circuit means including a high-pressure pump and a fluid reservoir, said high pressure pump having a capacity less than the combined peak load requirements for operating said shifting means and for operating said power steering means, but greater than each of said peak load requirements taken singly, said first-named throttle control means and said further throttle control means being connected in series with said high-pressure pump, said further throttle control means being disposed downstream from said first-named throttle control means in said fluid circuit means, and means for limiting the delivery output of said high-pressure pump including by-pass means disposed in said fluid circuit means upstream from said first-named throttle control means between said first-named throttle control means and said high-pressure pump.

2. A hydraulic system as defined in claim 1, wherein said by-pass means comprises transverse channel means for movement of pressure fluid therethrough from said high-pressure pump to said first-named throttle control means, conduit means connecting said by-pass means and said fluid reservoir, means in said by-pass means leading from said transverse channel means to said conduit means including connecting channel means and a cylinder, and a valve piston in said cylinder movable in response to pressure of fluid from said transverse channel means.

3. A hydraulic system as defined in claim 1, wherein said by-pass means comprises transverse channel means therethrough operably connected with said high-pressure pump and said first-named throttle control means, means restricting said transverse channel means, valve piston means slidably disposed in said by-pass means, connecting channel means operably connecting respective portions of said transverse channel means on opposite sides of said restricting means with respectively opposite ends of said valve piston means, further connecting channel means in said by-pass means operably connected with said reservoir, said valve piston being movable in response to fluid pressure from one of said respective portions to a position affording fluid communication from said one of said respective portions and said further connecting channel means.

4. A hydraulic system as defined in claim 1, wherein said by-pass means comprises transverse channel means connected at its respective ends to said high-pressure pump and said first-named throttle control means, piston and cylinder means in operative fluid communication with said transverse channel means, connecting passage means in operative fluid communication with said reservoir, the piston of said piston and cylinder means being movable in response to fluid pressure from said transverse channel means to a position affording fluid communication from said cylinder of said piston and cylinder means to said connecting passage means.

5. A hydraulic system as defined in claim 1, wherein said by-pass means comprises transverse channel means operably connecting said high-pressure pump and said first-named throttle control means, connecting channel means leading off from said transverse channel means, a fluid line terminating in said reservoir, said by-pass means comprising further connecting channel means terminating in said fluid line, and piston valve means movable in response to pressure of fluid received through said connecting channel means for providing fluid communication from said first-named connecting channel means and said further connecting channel means.

6. A hydraulic system according to claim 1, wherein said by-pass means comprises piston valve means and a plurality of channel means operatively connected to said pump, said first-named throttle control means and said reservoir, said piston valve means being movable in response to fluid pressure received through one of said channel means to a position affording fluid communication from said one of said channel means to another of said channel means.

References Cited by the Examiner

UNITED STATES PATENTS

| | | | |
|---|---|---|---|
| 1,890,010 | 12/32 | Vickers | 60—52 |
| 2,160,596 | 5/39 | Le Bleu | 60—52 X |
| 2,403,325 | 7/46 | Armington | 60—52 |
| 2,665,704 | 1/54 | Kanuch | 113—115 X |

FOREIGN PATENTS 211,148  10/57  Australia.

JULIUS E. WEST, *Primary Examiner.*

EDGAR W. GEOGHEGAN, *Examiner.*